United States Patent Office 3,397,245
Patented Aug. 13, 1968

3,397,245
METHOD OF MAKING DIACYL PEROXIDES
Herbert R. Appell, Pitcairn, Pa., assignor to Koppers Company, Inc., a corporation of Delaware
No Drawing. Continuation-in-part of application Ser. No. 251,023, Jan. 14, 1963. This application June 17, 1966, Ser. No. 558,231
11 Claims. (Cl. 260—610)

This invention relates to the preparation of diacyl peroxides. In one specific aspect it relates to a catalytic process for the preparation of symmetrical and unsymmetrical diacyl peroxides. This application is a continuation-in-part of my co-pending application Ser. No. 251,023, filed Jan. 14, 1963, now abandoned.

Diacyl peroxides have many uses in industry. For example, benzoyl peroxide is widely used as a free radical catalyst in the polymerization of styrene and other monomers; it is also used in bleaching flour and food oils. Acetyl benzoyl peroxide is useful in the polymerization of acrylics and unsaturated esters and also finds use as a chemical intermediate. Some peroxides which decompose readily, e.g., acetyl peroxide, are used in polymerization processes operating at moderate temperatures and other peroxides having greater stability, e.g. p-chlorobenzoyl peroxide, are used at higher temperatures. In general, the peroxides prepared according to the present invention are useful in a temperature range of from room temperature up to about 125° C. Ordinarily, the less stable peroxides are used at temperatures near the lower limits of this range. However, in the presence of activators even the more stable peroxides may be used at, or below, room temperature.

The term diacyl peroxides as used herein is synonymous with α,α'-dioxoperoxides and is intended to include diacyl peroxides, diaroyl peroxides, and acyl-aroyl peroxides.

Heretofore, symmetrical diacyl peroxides, that is, those in which the R groups in the equations below are the same, have been prepared by the reaction of an excess of acid anhydride or acyl chloride with alkaline solutions of hydrogen peroxide as illustrated by the equations.

I
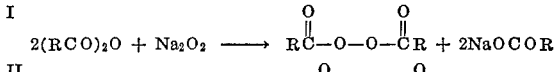

II
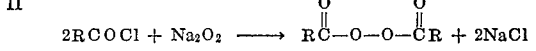

This process is limited to the preparation of symmetrical diacyl peroxides.

The unsymmetrical diacyl peroxides have been prepared by the reaction of the sodium salt of a peracid with an acyl chloride as illustrated by the equation III
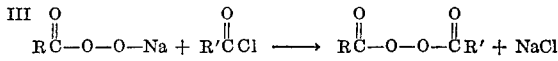

Unsymmetrical diacyl peroxides have not been produced commercially because of the difficulty of preparing these peroxides by previously known methods.

It is therefore an object of the present invention to provide a novel process for preparing diacyl peroxides.

It is another object of this invention to provide a process for preparing a wide variety of unsymmetrical diacyl peroxides.

In accordance with the present invention, I have discovered a method of making diacyl peroxides which comprises reacting preferably under anhydrous conditions, at a temperature of 0–75° C. an organic acid anhydride of the formula $(RCO)_2O$ wherein R is a member selected from the group consisting of lower alkyl, phenyl, lower alkyl phenyl, halophenyl, nitrophenyl and naphthyl, and an aldehyde of the formula

wherein R' is a member selected from the group consisting of lower alkyl, phenyl, lower alkyl phenyl, halophenyl, and naphthyl with oxygen in the presence of a catalyst of the formula

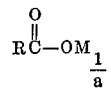

wherein M is a metal selected from the group consisting of magnesium and lithium, R is as defined aforesaid, and $a$ is an integer having a value corresponding to the valence of said metal.

This reaction is illustrated by the equation:

IV

wherein R and R' are defined as aforesaid. The diacyl peroxide is symmetrical when R is the same as R' and unsymmetrical when R is different from R'.

Acid anhydrides useful in the reaction have the general formula $(RCO)_2O$ wherein R is lower alkyl, phenyl, lower alkyl phenyl, halophenyl, nitrophenyl and naphthyl. Representative compounds include acetic anhydride, propionic anhydride, n-butyric anhydride, benzoic anhydride, toluic anhydride, t-butylbenzoic anhydride, chlorobenzoic anhydride, nitrobenzoic anhydride, naphthoic anhydride, etc. Although the best yields in the aliphatic series are obtained with straight chain anhydrides, especially with the lower members in the series, branched chain anhydrides, such as isobutyric anhydride, can be used if lower peroxide yields are acceptable. Relatively inert anhydrides such as phthalic anhydride and tetrachlorophthalic anhydride are not useful in this invention.

In general, aldehydes which can be autoxidized to form compounds containing active oxygen can be used in this invention. Aldehydes useful in the reaction have the general formula

wherein R' is lower alkyl, phenyl, lower alkyl phenyl, halophenyl, and naphthyl. Representative aldehydes include acetaldehyde, propionaldehyde, n-butyraldehyde, isobutyraldehyde, benzaldehyde, tolualdehyde, chlorobenzaldehydes, naphthaldehydes, etc. However, aldehydes such as nitrobenzaldehydes, terephthaldehyde and phthaldehydic acid have little or no utility in this invention.

The catalysts useful in this reaction are the magnesium and lithium salts of organic acids. The organic acids from which such lithium or magnesium salts are made should have a dissociation constant (Ka) greater than $1 \times 10^{-6}$. Organic acids having a dissociation constant of less than $1 \times 10^{-6}$ are too sluggish to give suitable yield of the peroxides. The organic acids should also form salts which are soluble in the reaction medium.

The acids which have been found to be best suited are the fatty acids having up to eight carbon atoms and chlorinated derivatives thereof, and benzoic acid with its halogenated, nitrated and lower alkylated derivatives. Examples of such fatty acids are acetic, propionic acid, butyric acid, hexanoic acid, chloracetic acid, etc. Examples of the benzoic acids useable are; benzoic acid, chlorobenzoic acid, bromobenzoic acid, nitrobenzoic acid, toluic acid, ethyl benzoic and the like.

Preferably, lithium and magnesium salts of such organic acids are used which are soluble in the reaction medium, and although insoluble salts may be used, these were found to be less effective. It is also preferred that the salt of the organic acid corresponding to the acid anhydride be used to enable ready separation of the products. For example, if acetic anhydride in the anhydride component, lithium or magnesium acetate is preferably used as the catalyst; similarly if benzoic anhydride is the anhydride component, lithium or magnesium benzoate is preferably used as catalyst. It is not essential to use the salt of the corresponding anhydride but purification of the peroxide is simplified because of the absence of foreign anions.

A convenient method of preparing the catalysts consists of dissolving the magnesium or lithium carbonate in the appropriate organic acid. When the acid anhydride contains some of the parent acid, the catalyst may be formed in situ by merely adding the magnesium or lithium carbonate to the impure acid anhydride. Other methods of preparing the salts of organic acids will be obvious to those skilled in the art.

The quantities of catalysts normally used between range 0.01 and 1 percent. Less than the minimum amount results in decreased yields whereas more than the maximum amount shows no improved effectiveness.

The temperatures required for preparing the products of the novel reaction range from 0° C. to about 75° C. Most diacyl peroxides are conveniently prepared in the 20–50° C. range. Generally, the less stable diacyl peroxides are prepared at the lower temperatures and the more stable peroxides at the higher temperatures.

The manufacturer of diacyl peroxides using the catalysts of this invention may be conducted batchwise or continuously. Certain peroxides are more adaptable to a batch process and others to a continuous process. Benzoyl peroxide, e.g., is readily obtained by continuously removing a stream of crude product from the reactor filtering the crude benzoyl peroxide, and recycling the filtrate to the reactor.

Ultraviolet radiation, ozone, or salts of cobalt, copper, manganese, etc. may also be used in combination with the catalysts of this invention, but they are not required and best results are ordinarily obtained in their absence.

Inert solvents may be used when the starting materials or products are normally solid. Useful solvents include ketones such as acetone and acetophenone; organic acids such as acetic, propionic, butyric, and benzoic acid; oxidation resistant alcohols, such as t-butyl alcohol; and normally liquid paraffins and cycloparaffins, such as hexane and cyclohexane. In particular, acetone may be used when the oxygen is pressured into a closed reaction system. However, when air or oxygen is passed through a reactor, a high boiling solvent, such as acetophenone, is preferred to minimize losses due to volatilization. Organic acid which may be used must correspond to the anhydride being reacted e.g. acetic acid is used as solvent for a reaction involving acetic anhydride.

The stoichiometry of the reaction requires that the molar ratio of anhydride to aldehyde be one to one. In many instances, an excess of anhydride to aldehyde is preferred. More specifically, the less reactive anhydrides give better results when present in a molar excess over the aldehyde.

My invention is further illustrated by the following examples.

EXAMPLE I

Benzaldehyde (15 ml.), benzoic anhydride (37 gms.), lithium benzoate (0.8 gm.) and 40 ml. acetophenone were placed in a liter flask fitted with a stirrer and a gas dispersion tube. The flask was placed in a water bath at 42–43° C. and stirring and oxygen flow started. Every two hours the solution was removed, cooled to about 16° C. and the precipitate of benzoyl peroxide and benzoic acid collected. Makeup benzaldehyde and benzoic anhydride were added to the filtrate and the resulting liquid returned to the autoxidation reactor. After five cycles the yield of recovered benzoyl peroxide was between 95 and 98 percent and the rate of reaction had not diminished.

EXAMPLE II

Benzaldehyde (10 gms.), propionic anhydride (13 gms.), and propionic acid (2 gms.) were placed in the autoxidation reactor with .04 percent by weight of lithium carbonate. After 1.5 hours at 45° C. a 92 percent yield of propionyl benzoyl peroxide was obtained. The peroxide, an oily liquid, was isolated by pouring into cold water and washing with 10 percent sodium carbonate solution.

EXAMPLE III

A series of experiments was conducted to determine the relative effectiveness of various catalysts. Five grams of benzaldehyde, 10 grams of benzoic anhydride and 10 grams of acetone were placed in each of four identical pyrex autoxidation reactors. The catalyst, amount of catalyst, and the conversion to benzoyl peroxide after two hours of autoxidation at 40° C. is shown in Table I.

TABLE I

| Reactor | Catalyst | Amount, percent | Conversion to Benzoyl peroxide |
|---|---|---|---|
| 1 | Lithium Benzoate | 0.02 | 52 |
| 2 | do | 0.2 | 70 |
| 3 | Magnesium Benzoate | 0.2 | 74 |
| 4 | Magnesium Carbonate | 0.2 | 21 |

EXAMPLE IV o-Chlorobenzaldehyde (12.5), acetic anhydride (10 gms.), acetic acid (2 ml.) and lithium acetate (0.04 gm.) were placed in the autoxidation reactor and treated with a stream of oxygen at 40° C. for two hours. A 90 percent conversion to acetyl o-chlorobenzoyl peroxide was isolated by pouring the product into cold water and collecting the solid peroxide.

EXAMPLE V

Lithium carbonate (0.1 gram) was dissolved in 20 ml. n-butyric anhydride containing 10 percent butyric acid. This solution was added to 10 gms. benzaldehyde and autoxidized in a stream of oxygen at 40° C. After two hours an 80 percent conversion to n-butyryl benzoyl peroxide was achieved. The peroxide was isolated by pouring into cold water and separating the liquid peroxide layer.

EXAMPLE VI

To a one liter glass flask, fitted with a porous glass inlet in the bottom, were added 106 gr. of benzaldehyde, 112 gr. of acetic anhydride, 11 gr. of acetic acid and 2 gr. of lithium benzoate. The flask was held at 35° C. (water bath) with stirring while oxygen was fed through the glass inlet. After ca 1 hour titration indicated the reaction was complete. The crude product was poured into cold water, the crystals formed separated by filtration, washed with water and dried. Acetyl benzoyl peroxide in 89% yield was obtained.

EXAMPLE VII

To an autoxidation reactor there was added 30 gr. of benzaldehyde, 74 gr. of benzoic anhydride and 1.5 gr. of magnesium acetate. The reaction mixture was treated with an oxygen stream for two hours at 40° C. The mixture was then poured into 5% aqueous sodium carbonate solution and the precipitated product separated by filtration. The conversion to benzoyl peroxide was 85%.

EXAMPLE VIII

Magnesium carbonate (0.1 gm.) was dissolved in 10 ml. propionic acid. The resulting solution was added to a round bottomed flask fitted with a stirrer and a gas dispersion tube. Seventy gms. propionic anhydride and 35 gms. iso-butyraldehyde were added and stirring and oxygen flow started. The temperature was kept at 20° C., stirring was vigorous and the addition of oxygen kept low to prevent loss of the aldehyde by vaporifiation. After four hours a 60 percent yield of propionyl isobutyryl peroxide was obtained. The peroxide was isolated by pouring into ice water and separating the organic layer. This peroxide was not stable at room temperture and required storage at 0° C.

EXAMPLE IX

Following the procedure of Example II and using the anhydride, solvent, and catalyst set forth therein, p-tolualdehyde and 1-naphthaldehyde were substituted for the aldehyde component. Satisfactory yields were obtained.

EXAMPLE X

Following the procedure of Example II and using the same aldehyde and catalyst set forth therein, acetone was substituted as the solvent and m-toluic anhydride, p-nitrobenzoic anhydride, o-chlorobenzoic anhydride, and 2-naphthoic anhydride were substituted for the anhydride component. Satisfactory yields were obtained.

I claim:
1. A method of making diacyl peroxides comprising reacting at a temperature of 0–75° C.
  (a) an organic acid anhydride of the formula $(RCO)_2O$ wherein R is a member selected from the group consisting of lower alkyl, phenyl, lower alkyl phenyl, halophenyl, nitrophenyl and naphthyl and
  (b) an aldehyde of the formula

wherein R' is a member selected from the group consisting of lower alkyl, phenyl, lower alkyl phenyl, halophenyl, and naphthyl with
  (c) oxygen in the presence of a catalyst comprising a metal salt of a carboxylic acid, said metal being selected from the group consisting of lithium and magnesium, said salt being soluble in the reaction mixture.

2. The method of claim 1 wherein said carboxylic acid is an aliphatic acid having up to eight carbon atoms.

3. The method of claim 1 wherein said carboxylic acid is selected from the group consisting of benzoic acid, halogenated benzoic acids, nitrated benzoic acids and lower alkylated benzoic acids.

4. A method of making diacyl peroxides comprising reacting at a temperature of 0–75° C.
  (a) an organic acid anhydride of the formula $(RCO)_2O$ wherein R is a member selected from the group consisting of lower alkyl, phenyl, lower alkyl phenyl, halophenyl, nitrophenyl and naphthyl and
  (b) an aldehyde of the formula

wherein R' is a member selected from the group consisting of lower alkyl, phenyl, lower alkyl phenyl, halophenyl, and naphthyl with
  (c) oxygen in the presence of
  (d) a catalyst of the formula

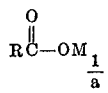

wherein M is a metal selected from the group consisting of lithium and magnesium, R is defined as aforesaid, and $a$ is an integer having a value corresponding to the valence of said metal.

5. The method according to claim 4 wherein R is the same as R'.

6. The method according to claim 4 wherein R is different from R'.

7. The method of claim 4 wherein the diacyl peroxide is acetylbenzoyl peroxide, the organic acid anhydride is acetic anhydride, the aldehyde is benzaldehyde and the catalyst is lithium acetate.

8. A method of making acetyl-benzoyl peroxide comprising reacting at a temperature of 0–75° C. benzoic anhydride and acetaldehyde with oxygen in the presence of a catalytic amount of magnesium benzoate.

9. A method of making benzoyl peroxide comprising reacting at a temperature of 0–75° C. benzoic anhydride and benzaldehyde with oxygen in the presence of a catalytic amount of lithium benzoate.

10. A method of making benzoyl peroxide comprising reacting at a temperature of 0–75° C. benzoic anhydride and benzaldehyde with oxygen in the presence of a catalytic amount of magnesium benzoate.

11. The method of claim 4 wherein the diacyl peroxide is acetyl peroxide, the temperature is 0–25° C., and the organic acid anhydride is acetic anhydride, the aldehyde is acetaldehyde and the catalyst is magnesium acetate.

No references cited.

BERNARD HELFIN, *Primary Examiner.*

W. B. LONE, *Assistant Examiner.*